United States Patent [19]
Miller

[11] Patent Number: 5,319,994
[45] Date of Patent: Jun. 14, 1994

[54] CLAMP-ON AERODYNAMIC BICYCLE HANDLEBAR ATTACHMENT

[76] Inventor: Scott E. Miller, 736 Morgan St., Santa Rosa, Calif. 95401-7350

[21] Appl. No.: 913,052

[22] Filed: Jul. 14, 1992

[51] Int. Cl.⁵ .................. B62K 21/12; B62K 21/26
[52] U.S. Cl. .................. 74/551.8; 74/551.1; 280/281.1
[58] Field of Search .............. 74/551.1–551.8; 280/279, 281.1, 261; D12/178

[56] References Cited

U.S. PATENT DOCUMENTS

| | | | |
|---|---|---|---|
| D. 323,805 | 2/1992 | Giard | D12/178 |
| 598,083 | 2/1898 | Gilbert | 74/551.1 |
| 626,736 | 6/1899 | Taulbee | 74/551.8 |
| 3,289,493 | 12/1966 | Church | 74/551.8 |
| 4,750,754 | 6/1988 | Lennon | 280/261 |
| 4,829,847 | 5/1989 | Modolo | 74/551.1 |
| 4,873,886 | 10/1989 | Renner | 74/551.8 |
| 4,878,397 | 11/1989 | Lennon | 74/551.1 |
| 5,000,469 | 3/1991 | Smith | 280/261 |
| 5,145,210 | 9/1992 | Lennon | 74/551.1 |
| 5,154,094 | 10/1992 | Klieber | 280/261 X |
| 5,154,095 | 10/1992 | Giard | 74/551.8 |
| 5,163,339 | 11/1992 | Giard et al. | 74/551.1 |
| 5,195,394 | 3/1993 | Latta | 74/551.8 |
| 5,224,396 | 7/1993 | Lobbezoo et al. | 74/551.3 |
| 5,235,871 | 8/1993 | Yamazaki et al. | 74/551.8 |

FOREIGN PATENT DOCUMENTS

| | | | |
|---|---|---|---|
| 325192 | 4/1903 | France | 74/551.1 |
| 91/04903 | 4/1991 | PCT Int'l Appl. | 74/551.1 |
| 1134458 | 1/1985 | U.S.S.R. | 74/551.1 |
| 12218 | of 1897 | United Kingdom | 74/551.1 |

Primary Examiner—Vinh T. Luong
Attorney, Agent, or Firm—George W. Wasson

[57] ABSTRACT

A handlebar attachment that can be clamped onto the existing handlebar of a bicycle or the like. The handlebar attachment permits the rider of the bicycle to assume an improved aerodynamic position while riding and places the rider in a position for permitting increased lung air intake. The attachment includes hand area elements, sliding elements and joint element for joining the hand area elements and the sliding elements. The assembly is attachable to existing handlebars with adjustable clamps.

8 Claims, 3 Drawing Sheets

CLAMP-ON AERODYNAMIC BICYCLE HANDLEBAR ATTACHMENT

This invention relates to bicycles and to handlebars therefor, and more particularly, to a clamp-on attachment for a bicycle handlebar that is adapted to position the rider of the bicycle in an operating position that will improve the performance and stamina of the rider.

BACKGROUND OF THE INVENTION

Bicycle designers, manufacturers and users are aware of the complexity of bicycle construction and the changes that have been made recently in the handlebar construction and position on bicycles. Bicycle riders are continuously trying to improve their aerodynamic position while riding a bicycle and to improve their stamina while riding. To that end the handlebars of bicycles have been formed to place the rider in a riding position that minimizes the frontal area of the rider. Other handlebar constructions have attempted to place the rider in a position that is both comfortable and efficient in rider performance. Some of these handlebar and handlebar attachments are shown and described in the following U.S. Pat. Nos.:

4,750,754, issued Jun. 14, 1988 to D. C. Lennon,
4,829,847, issued May 16, 1989 to D. Modolo,
4,873,886, issued Oct. 17, 1989 to R. Renner,
4,878,397, issued Nov. 7, 1989 to D. C. Lennon,
5,000,469, issued Mar. 19, 1991 to C. J. Smith.

Some of the above listed patents are particularly adapted for riders of racing bicycles and are intended for use on riding surfaces that are reasonably smooth and uniform. Some of the bicycling enthusiasts prefer to ride bicycles on less formalized riding surfaces even to the extremes of riding on mountain paths and other rough surfaces. A bicycle adapted for such rough riding should provide the rider with efficient operating posture and position as well as provide for a restfull and comfortable position. Bicycle riders wish to assume the most efficient aerodynamic position while positioning the body in a posture that will permit the maximum of energy transfer to the bicycle pedals. Also important to the rider's efficiency in operating the bicycle is the positioning of the rider in a posture that will permit the rider to intake a maximum of air while breathing to extend the rider's stamina while riding.

While others have suggested forming the handlebar and/or attachments to the handlebar in forms that are intended to accomplish the positioning of the rider, none have provided for easily adjustable elements that accomplish all of the desired rider positioning and at least one of the attachments available to bicycle riders is a continuous loop or U-shaped design that does not allow an elbows-out, natural hand/wrist alignment for optimum steering control and the continuous loop design is not a compact, unobstrucive design.

SUMMARY OF THE PRESENT INVENTION

In accord with the present invention, a clamp-on attachment is disclosed that may be attached to the existing handlebar of a bicycle at or near the steering post with a portion of the clamp-on attachment extending forward of the steering post and providing portions that may be grasped by the rider's hands to place the rider in a preferred aerodynamic riding position. The invention is designed to be attachable to many different forms of handlebars and is designed to be adjustable to adapt itself to use by riders of different sizes. The adjustable portions are easily adjusted and, when positioned in the desired adjusted position, are securely maintained as an attachment to the bicycle. The attachment is light weight so as not to change the balance or operating characteristics of the bicycle. Furthermore, the attachment adds a minimum of additional structure to the bicycle.

It is one of the objects of the clamp-on attachment to place portions of the attachment in natural hand alignment for the rider while in the preferred aerodynamic position.

A further object in accord with the preceding object is to place portions of the attachment in positions that will permit the rider of the bicycle to rest the elbows on the existing handlebar while grasping the extended portions of the attachment with the hands.

A further object of the present invention in accord with the preceding objects is to provide an attachment for a bicycle handlebar that may be adjusted in several different axes so as to be useable by riders of differing size and structure.

These and further objects of the invention will be readily apparent to those skilled in the art from the appended drawings and specification illustrating preferred embodiments wherein:

DETAILED DESCRIPTION

Figure 1:
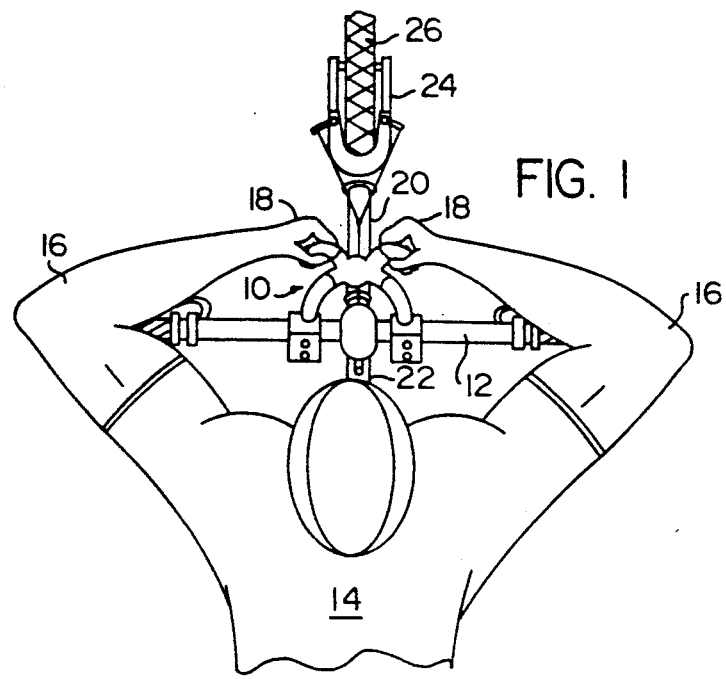
FIG. 1 is fragmentary view from above the handlebar and forward wheel portion of a bicycle showing the attachment of the present invention and the position of rider of the bicycle when using the attachment.

With reference to the drawings it should be understood that the handlebar attachment of the present invention will be described as an attachment for a bicycle but that the attachment could be installed on any mechanism including a two wheeled bicycle, a tricycle or even an engine powered vehicle using a central steering post and crosspiece handlebar. While not illustrated in the drawings, the attachment and its use as shown in FIG. 1 is on a bicycle having the usual frame supported on a rotatable rear wheel with a fixed and driven axel and a rotatable front wheel with an axel fixed in a front fork formed as a part of or attached to a steering post rotatable about an axis in the bicycle frame so as to permit steering of the bicycle. The steering post has a handlebar of some form usually having an axis perpendicular to the axis of the steering post.

Figure 2:
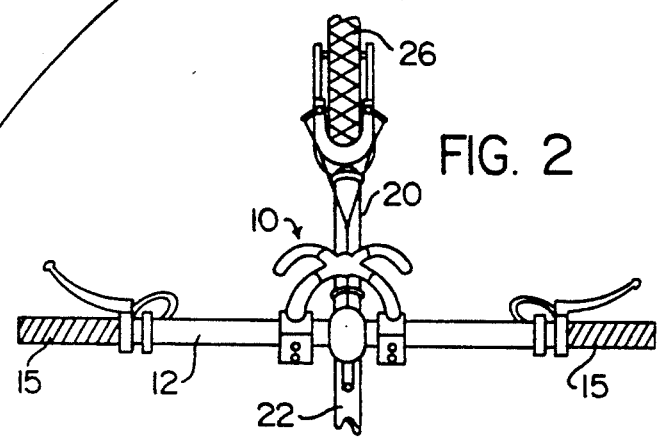
FIG. 2 is a partial top view of the steering post, handlebar and front wheel of a bicycle with the attachment of the present invention installed.

As illustrated in FIG. 1, the attachment 10 of the present invention is shown mounted to the handlebar 12 of a bicycle and the upper torso of a rider 14 of the bicycle is shown leaning forward over the handlebar 12 with elbows or forearms 16 resting on grips or padded handlebar end portions 15 the ends of the handlebar 12 and hands 18 grasping a portion of the attachment 10. The handlebar 12 is fixed to the steering post 20 at the front end of the frame 22 and above the front fork 24 supporting the front wheel 26. FIG. 2 illustrates the attachment 10 as shown in FIG. 1 without the rider's torso. It should be understood that the illustrated straight handlebar is one form of handlebar and that curved handlebars of many forms are contemplated as structures to which the attachment 10 of the present invention could be mounted.

Figure 3:
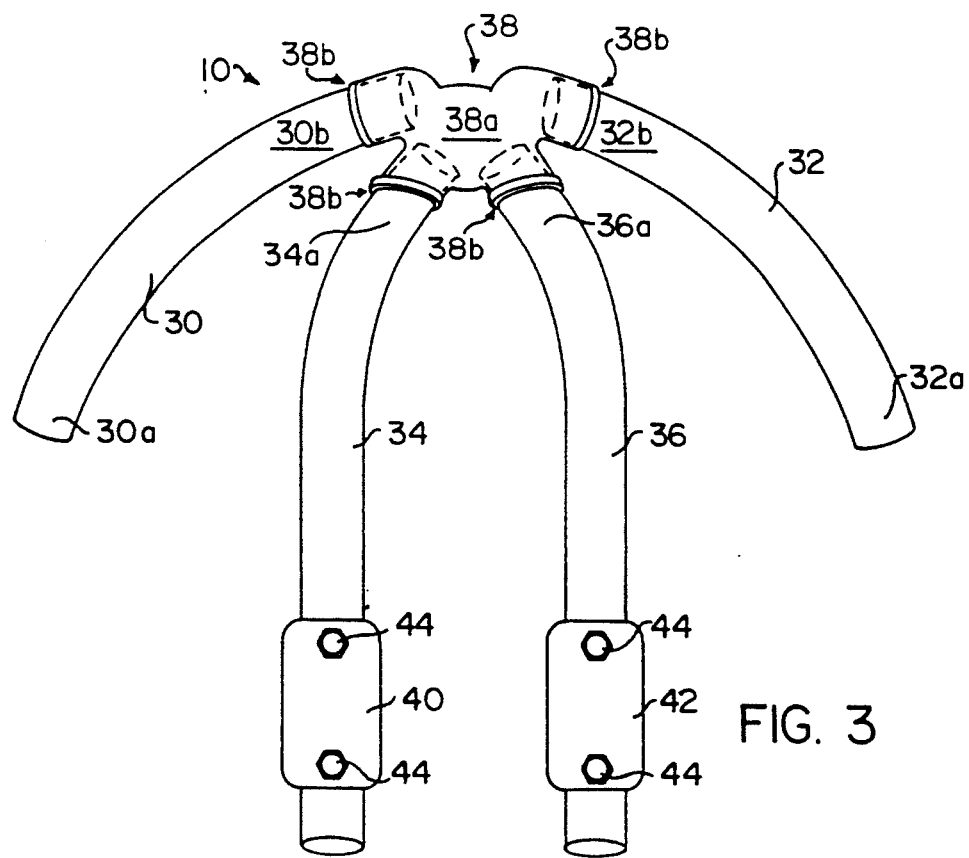
FIG. 3 is a top view of the attachment of the present invention.

FIG. 3 illustrates one form of the attachment 10 of the present invention. In the form shown, the attachment 10 comprises a pair of hand area elements 30 and 32 and a pair of sliding elements 34 and 36 joined by a joint element 38. One of each of the sliding elements 34 and 36 is slideable mounted in one of a pair of handlebar clamps 40 and 42, respectively. As shown in FIGS. 1 and 2 those handlebar clamps 40 and 42 are attached to handlebar 12 at each side of the steering post 20 and provide for slideable attachment of the sliding elements 34 and 36 to position the joint element 38 forward of and angularly positioned with respect to the axis of the handlebar 12.

Figures 4, 5:
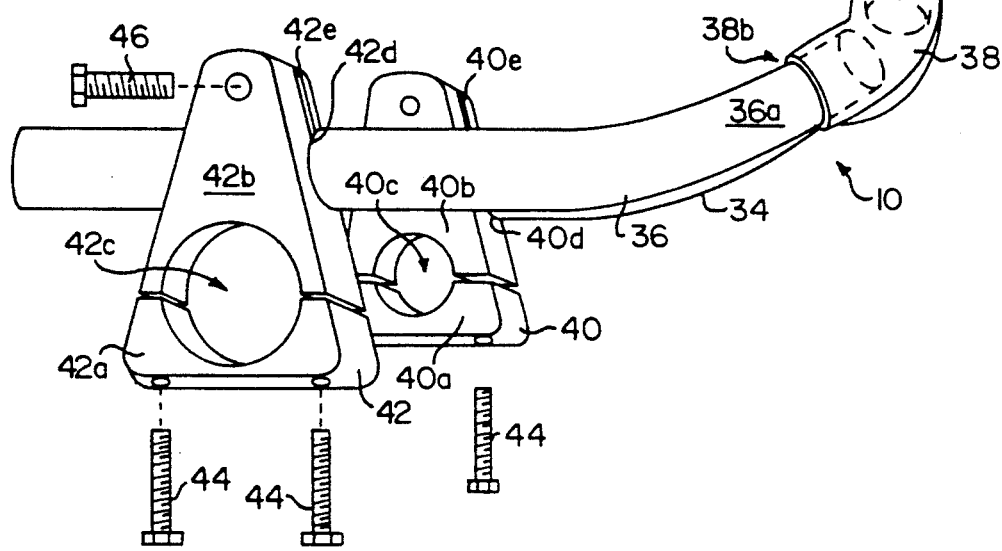
FIG. 4 is a side perspective view of the attachment of the present invention.
FIG. 5 is a top view of an alternative form of construction for the attachment of the present invention.

As best shown in FIG. 4, the handlebar clamps 40 and 42 are preferably constructed in two parts 40a, 40b, 42a and 42b, respectively, with mating cut out portions to create aligned holes 40c and 42c through the clamps to accommodate the handlebar 12. The two part clamps are attached to each other and secured to the handlebar 12 by a pair of threaded bolts 44 passing freely through parts 40a and 42a and threaded into tapped holes in parts 40b and 42b. The aligned holes 40c and 42c permit the attachment to be angularly positioned with respect to the axis of the handlebar 12 before the threaded bolts 44 are tightened to secure the clamps to the handlebar.

Parts 40b and 42b are formed with a circular holes 40d and 42d, having an axis perpendicular to the axis of holes 40c and 42c, for accommodation of the sliding members 34 and 36, respectively. Each part 40 and 42 is slotted at 40e and 42e to form portions of each part that can be forced together to secure the sliding elements 34 and 36 within the clamps while permitting the positioning of the joint element forward of the handlebar. A threaded bolt 46 is provided for tightening the slotted parts and the holes 40c and 42c together.

The construction of clamps 40 and 42 in the form shown is merely representative of many forms that such clamps may assume. The importance of these clamps and their construction is to permit the user to be able to position the attachment of the present invention in a location that will be comfortable and efficient for the user of the attachment.

As shown in FIGS. 3 and 4, the sliding elements 34 and 36 are formed with symetrical angular bends in two planes, first to direct the ends 34a and 36a of the elements away from the clamps toward each other (as seen in FIG. 3) and upwardly with respect to the handlebar (as seen in FIG. 4). FIGS. 3 and 4 also show the symetrical angular bends in hand area elements 30 and 32 to provide a free end 30a and 32a away from the joint element 38 and ends 30b and 32b at the joint element 38. The joint element 38 joins the ends 30b, 32b, 34a and 36a into a unitary assembly with the hand area elements 30 and 32 in a fixed angular and spaced relation with respect to each other and with respect to the handlebar 12. The symetrical bends in the hand area elements 30 and 32 are designed to provide a comfortable alignment with the hand contour of the user, as shown in FIG. 1, when the attachment is fixed to a bicycle. The adjustable position cf the joint element 38 in front of and angularly with respect to the handlebar provides for comfortable alignment of the attachment with respect to the rider's elbows resting on the handlebar 12.

The joint element 38 is formed with four sockets 38b adapted to accommodate the ends 30b, 32b, 34a and 36a of the hand area elements 30 and 34 and the sliding elements 34 and 36. In one form of construction, the joint element 38 is molded or cast to provide a strong central portion 38a and properly aligned socket holes 38b for receiving the ends of the hand area elements and the sliding elements. The sockets are adapted to receive the free ends of those elements and the elements are suitably secured to the insides of the sockets by suitable means such as welding, soldering or gluing. When the hand area elements and the sliding elements are joined to the joint element, the assembly provides a complete attachment that may be fixed to the handlebar 12.

While not limiting the construction of the elements of the present invention, the following are typical materials, lengths and construction forms for the elements. The hand area elements and the sliding elements may be constructed of tubular stock having an outside diameter of ⅝ inches or ¾ inches and a wall thickness adequate to provide the rigidity needed for the elements. Typical wall thickness of about 0.058 inches and a material of 6061 aluminum alloy tempered to a T-6 hardness would be adequate. In the case of the hand area element, a typical arcuate bond of the element between the free end and the end attached to the joint element of about 65° would place the free end of the element in a comfortable position for most bicycle riders. In the case of the sliding element, a typical arcuate bend of the element between the end attached to the joint element and the end held in the handlebar clamps of about 37° would place the sliding elements in an appropriate alignment with the handlebars and the joint element ahead of the steering post. It should be understood that alternative stock materials and different angles are to be included in the design of the present invention.

The arcuate bend of the hand area elements and the angle between those elements and the joint element are adjusted to place the free ends of the hand area elements above and directed toward the handlebar of the bicycle. As shown in FIG. 1, the rider of the bicycle can rest the elbows on the ends of the handlebar and have the hands in a comfortable position to grasp the free ends of the hand area elements in front of and above the steering post.

Figure 6:
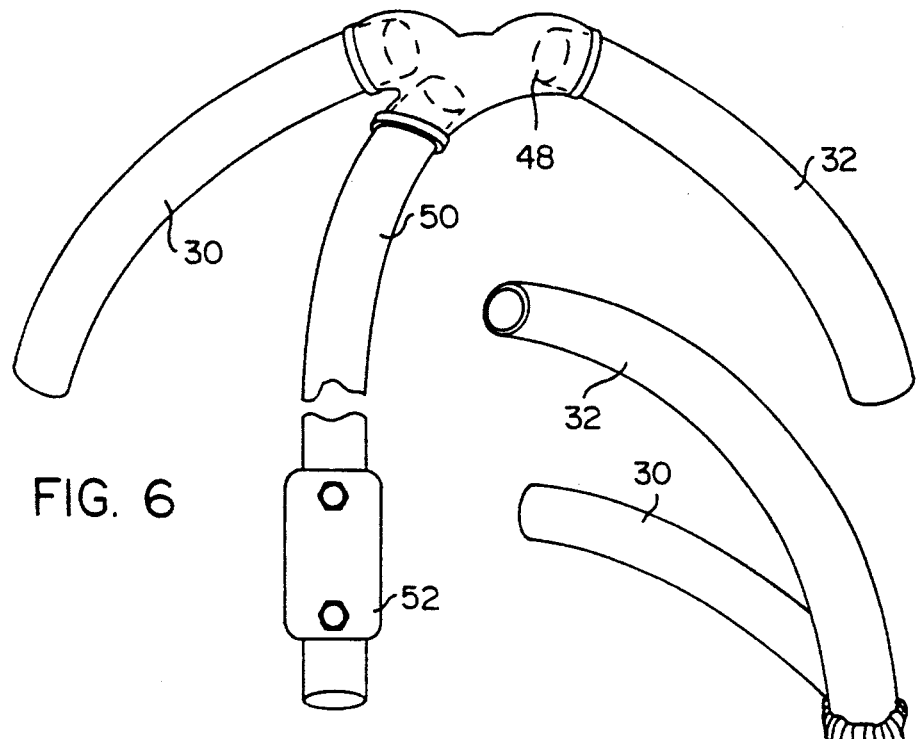
FIG. 6 is a top view of another alternative form of construction for the attachment of the present invention.
Figure 7:
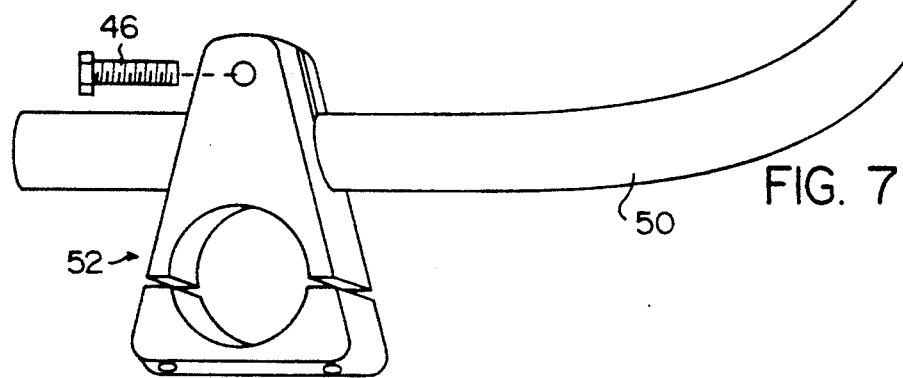
FIG. 7 is a side perspective view of another alternative form of construction for the attachment of the present invention.
Figure 8:
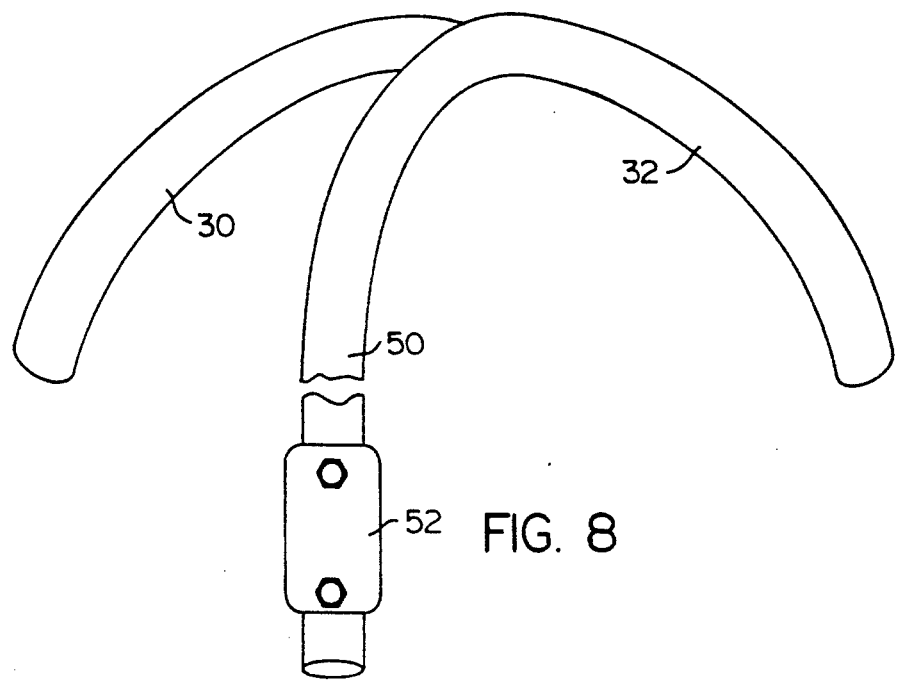
FIG. 8 is a top view of the attachment shown in FIG. 7.

Alternative forms of the attachment of the present invention are shown in FIGS. 5, 6, 7 and 8. FIG. 5 illustrates the attachment formed without the separate joint element 38 and with the hand area elements 30 and 32 joined by suitable means, such as by welding or soldering, to the sliding elements 34 and 36 so as to form a secure bonding of the elements in a desired alignment. This form of construction may be less costly to construct because of the elimination of the separate joint element 38. FIGS. 6, 7 and 8 illustrate the attachment of the present invention with only one sliding element and one clamp for attaching the assembly to the handlebar.

As shown in FIG. 6 the separate hand area elements 30 and 32 are fixed to a three socket joint element 48 to position the hand area elements in the desired relative alignment. A single sliding element 50 and a single clamp 52, constructed similarly to the clamps 40 and 42, provide for positioning of the assembly with respect to the handlebar 12. FIGS. 7 and 8 illustrate the construction of the three part assembly with a welded or soldered connection of the elements replacing the three socket joint element 48. In each of these alternate forms for the attachment, the bending of the hand area elements and the sliding elements is as was described with respect to the form shown in FIGS. 3 and 4.

The use of the attachment of the present invention should be readily apparent from the foregoing description of the construction of the attachment. The attachment is mounted on a bicycle, or the like, with clamps that attach it to the handlebar on both sides of, and in very close proximity to the steering post, neck or stem of the bicycle. The attachment allows the rider to rest the elbows or forearms on the existing rubber hand grips at the end of the handlebars and to maintain control of the bicycle steering by holding onto the hand area elements of the attachment. The attachment is adjustable (up and down) through the expandable hole in the handlebar clamp. The unit is also adjustable around the radius of the handlebar. By loosening the clamp around the handlebar, the attachment can be moved in an arc, pivoting around the radius of the handlebar. The complete attachment, when mounted on the bicycle, allows the user to rest the elbows or forearms on the hand grips at the end of the handlebar and to grasp the hand area elements above the front wheel of the bicycle. When used in that manner, the position lowers the head and chest of the rider into a more horizontal, aerodynamic position to significantly enhance the performance and comfort of the rider. The position of the elbows outside of the chest cavity of the rider allows for greater chest and lung capacity and improved oxygen intake for the rider.

The design of the attachment of the present invention is shown as hand area elements without mechanisms attached to the free ends. It should be understood that the usual bicycle operating mechanisms can be mounted on the free ends of the hand area elements so that the rider may control brakes with the usual brake control levers and that the attachment may provide for the support of other accessories such as lights, light controllers, gear selection levers, speedometers or the like.

While certain preferred embodiments of the invention have been specifically disclosed, it should be understood that the invention is not limited thereto as many variations will be readily apparent to those skilled in the art and the invention is to be given its braodes possible interpertation within the terms of the following claims.

I claim:

1. A clamp-on aerodynamic handlebar attachment for a substantially straight handlebar that connects to a steering post of a bicycle forward of the bicycle seat, said handlebar consisting of a pair of bar portions one of said pair on each side of said steering post and having an axis substantially perpendicular to the frame of said bicycle to form said handlebar and establishing a straight handlebar portion on each side of said steering post with end portions at each end of said straight handlebar portions, said clamp-on aerodynamic handlebar attachment comprising:
   a) a pair of hand area elements,
   b) at least one sliding element,
   c) said hand area elements and said sliding element being joined at a joint so as to provide a free end for said hand area elements and a free end for said sliding element with said free ends of said hand area elements extending symetrically outwardly from said joint and said free end of said sliding element directed away from said joint and said free ends of said hand area elements,
   d) at least one adjustable handlebar clamp, said clamp including means for adjustably attaching said clamp to a bar portion on one side of said steering post, said clamp being adapted to slideably receive and adjustably hold said free end of said sliding element,
   e) said pair of hand area elements and said sliding element being an assembly adapted to be positioned with respect to and adjustably clamped on said handlebar by said clamp with said hand area elements forward of said steering post and positioned with respect to said handlebar and steering post with said free ends of said hand area elements directed toward said handlebar so as to permit a rider of said bicycle to rest the elbows of the rider on said bar portions forming said handlebar while grasping said hand area elements with the rider's hands.

2. A clamp-on aerodynamic handlebar attachment for a substantially straight handlebar that connects to a steering post forward of the bicycle seat, said handlebar consisting of a pair of extending straight bar portions one of said pair on each side of said steering post to form said handlebar and establishing a straight handlebar portion on each side of said steering post with end portions spaced from said steering post at each end of said straight handlebar portions, said clamp-on aerodynamic handlebar attachment comprising:
   a) a pair of hand area elements,
   b) a pair of sliding elements,
   c) a four way joint element, said four way joint element being adapted to:
      i) receive and hold said pair of hand area elements with the free ends of each hand area element in symetrical position with respect to each other with said free ends extending outwardly from said four way joint element and,
      ii) receive and hold said pair of sliding elements with the free ends of each sliding element in symetrical position with respect to each other and directed toward said handlebar of said bicycle,
   d) a pair of adjustable handlebar clamps, one of said pair being adjustably attachable to said bar portions on each side of said steering post, each of said clamps being adapted to adjustably slideably receive and hold said free end of one of said said sliding elements,
   e) said pair of hand elements, four way joint and pair of sliding elements being an assembly of said handlebar attachment adapted to be positioned with respect to said handlebar and clamped on said handlebar with said hand area elements forward of and directed toward said steering post and positioned by said sliding elements with respect to said handlebar and steering post so as to permit a rider of said bicycle to rest the elbows of the rider on said end portions of said bar portions while grasping said hand area elements with the rider's hands in comfortable normal hand/forearm alignment.

3. A clamp-on aerodynamic handlebar attachment for a substantially straight bicycle handlebar that connects to a steering post of a bicycle forward of the bicycle seat and consists of a pair of extending straight bar portions one on each side of said steering post and having an axis perpendicular to the frame of said bicycle to form said handlebar and establishing a straight handlebar portion on each side of said steering post with handlebar end portions spaced from said steering post at each end of said straight handlebar portions, said clamp-on aerodynamic handlebar attachment comprising:

a) a pair of hand area elements,
b) at least one sliding element,
c) means for joining said hand area elements and said sliding element, said means for joining including means to:
  i) receive and hold one end of said pair of hand area elements with the free ends of each hand area element in symetrical position with respect to each other with said free ends extending outwardly from said means for joining, and
  ii) receive and hold one end of said sliding element with the free end of said sliding element in spaced relation with respect to said free ends of said pair of hand area elements and directed toward said handlebar of said bicycle,
d) at least one adjustable handlebar clamp, said clamp including means for adjustably attaching said clamp to one of said bar portions of said handlebar on one side of said steering post, said handlebar clamp being adapted to slideably receive and adjustably hold said free end of said sliding element, said sliding element being adjustably positioned within said handlebar clamp to determine the forward position of said hand area elements forward of said steering post,
e) said hand area elements being arcuately bent from said means for joining said hand area elements and said sliding element to position said free ends of said hand area elements above and directed toward said handlebar when attached,
f) said sliding element being arcuately bent along a portion of its length between said handlebar clamp and said means for joining said hand area elements and said sliding element to position said means for joining above the axis of said bar portions of said handlebar,
g) said pair of hand area elements, said sliding element and said means for joining being an assembly of said handlebar attachment adapted to be positioned with respect to and clamped on said handlebar with said hand area elements forward of and symetrical to said steering post and positioned with respect to said handlebar end portions and steering post so as to permit a rider of said bicycle to rest the elbows of the rider on said handlebar end portions of said handlebar while grasping said hand area elements with the rider's hands in comfortable normal hand/forearm alignment.

4. The handlebar attachment of claim 3 wherein said arcuate bend of said hand area elements is about 65° from the portion of said element attached to said joint.

5. The handlebar attachment of claim 3 wherein said arcuate bend of said sliding elements is about 37° from the portion of said sliding element attached to said joint.

6. The handlebar attachment of claim 3 wherein said hand area elements and said sliding elements are tubular.

7. The handlebar attachment of claim 3 wherein said joint of said hand area elements and said sliding element is constructed as a unitary element with openings for receiving said hand area elements and said sliding element.

8. The handlebar attachment of claim 3 wherein said joint of said hand area elements and said sliding element is a four way unitary element formed to position said hand area elements and a pair of said sliding elements in a predetermined alignment.

* * * * *